(12) United States Patent
Hsiao (10) Patent No.: US 7,578,703 B2
(45) Date of Patent: Aug. 25, 2009

(54) CARD CONNECTOR

(75) Inventor: Hsueh-Lung Hsiao, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/069,770

(22) Filed: Feb. 12, 2008

(65) Prior Publication Data
US 2008/0194148 A1 Aug. 14, 2008

(30) Foreign Application Priority Data
Feb. 12, 2007 (TW) ............................. 96202651 U (51) Int. Cl.
*H01R 24/00* (2006.01)
(52) U.S. Cl. ...................... 439/630; 439/159
(58) Field of Classification Search ......... 439/630–632, 439/159–160
See application file for complete search history.

(56) References Cited
U.S. PATENT DOCUMENTS
7,056,155 B2 6/2006 Fan
7,229,300 B2 6/2007 Lai
7,234,969 B2 * 6/2007 Chang et al. ................ 439/630

\* cited by examiner

*Primary Examiner*—Truc T Nguyen
(74) *Attorney, Agent, or Firm*—Wei Te Chung (57) ABSTRACT

A card connector (100) includes a terminal module (2) and an insulating housing (3). The terminal module has a body plate (20) and a plurality of first terminals (21) received in the body plate. The insulating housing associates with the terminal module to define a card slot (6) and a direction of a card inserted. A plurality of second terminals (5) are retained in the insulating housing and suspend in the card slot. Each second terminal includes a tail section protruding out of the card slot, an engaging section projecting into the card slot to engage with the selecting card, and a suspending section connecting the tail section and the engaging section. Each engaging section comprises a lead point at the free end thereof. Wherein the body plate of the terminal module includes a protection wall face (2092, 201) having an upper surface (2091, 200), and the lead points of the terminal are arranged behind the protection wall face and under the upper surface of the protection wall face along the direction of the card inserted.

12 Claims, 9 Drawing Sheets

CARD CONNECTOR

BACKGROUND OF THE INVENTION

1. Field of the Invention

The present invention relates to a structure of a card connector used for memory cards for using in various portable information equipments, such as a portable telephone or a NoteBook, or memory support equipments such as a digital camera or a digital AV equipment.

2. Description of Prior Arts

A regular card connector is made based on a n-in-one structure capable of selectively receiving different memory cards. Its housing has therein an insertion chamber and multiple sets of terminals for engaging with different memory cards, such as Memory Stick (MS) card, Smart Media (SM) card, Multi-Media Card (MMC), and Secure Digital (SD) card.

A conventional n-in-one card connector as described above has an insertion chamber, and two or more memory cards can be selectively inserted into the insertion chamber. Particularly, to avoid an inserted card from engaging with wrong terminals, the multiple sets of terminals are arranged far away from each other. As a result, some sets of terminals are placed in the chamber suspending without any protection. If a user inserts one selected card into the chamber incorrectly, a damage to the terminals may occur to result in malfunction of the card connector. Further, when the user inserts a memory card into the housing obliquely or improperly, the inserted memory card may also damage the terminals of the card connector.

Therefore, it is desirable to provide an n-in-one card connector that eliminates the aforesaid problems.

SUMMARY OF THE INVENTION

An object, therefore, of the invention is to provide a card connector receiving terminals capable of preventing the terminals from being damaged by an insertion card.

In the exemplary embodiment of the invention, a card connector includes a terminal module and an insulating housing. The terminal module has a body plate and a plurality of first terminals received in the body plate. The insulating housing associates with the terminal module to define a card slot and a direction of a card inserted. A plurality of second terminals are retained in the insulating housing and suspending in the card slot. Each second terminal includes a tail section protruding out of the card slot, an engaging section projecting into the card slot to engage with the selecting card, and a suspending section connecting the tail section and the engaging section. Each engaging section comprises a lead point at the free end thereof. Wherein the body plate of the terminal module includes a protection wall face having an upper surface, and the lead points of the terminal are arranged behind the protection wall face and under the upper surface of the protection wall face along the direction of the card inserted.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Referring to FIG. 1 to FIG. 9, a card connector 100 for selectively receiving a first card, such as a SD card, and a second card, such as a MS card, in accordance with present invention comprises a shell 1, a terminal module 2, an insulating housing 3, a first ejecting mechanism 4 and a second mechanism 4'.

Figure 1:
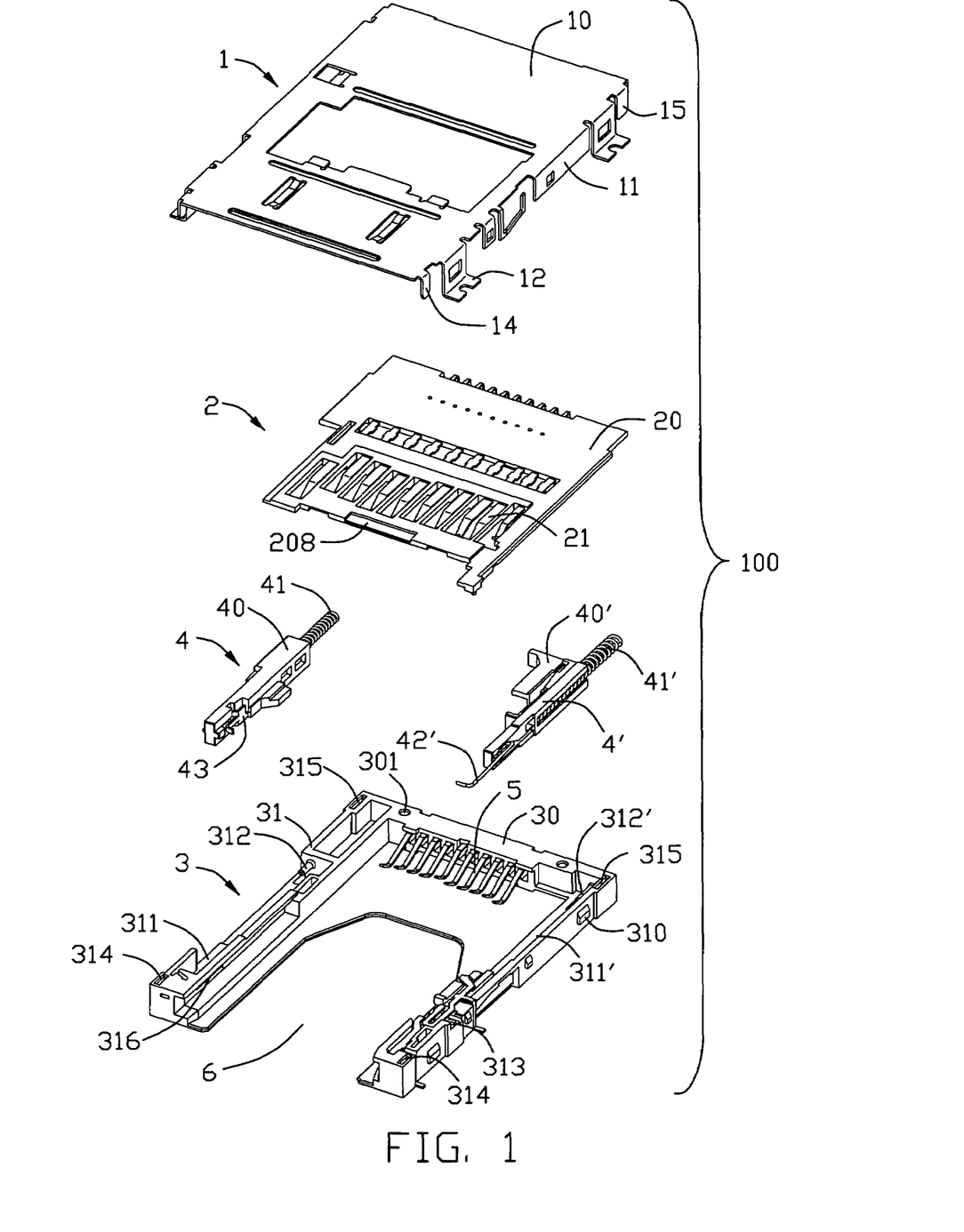
FIG. 1 is an exploded view of a card connector in accordance with present invention.
Figure 2:
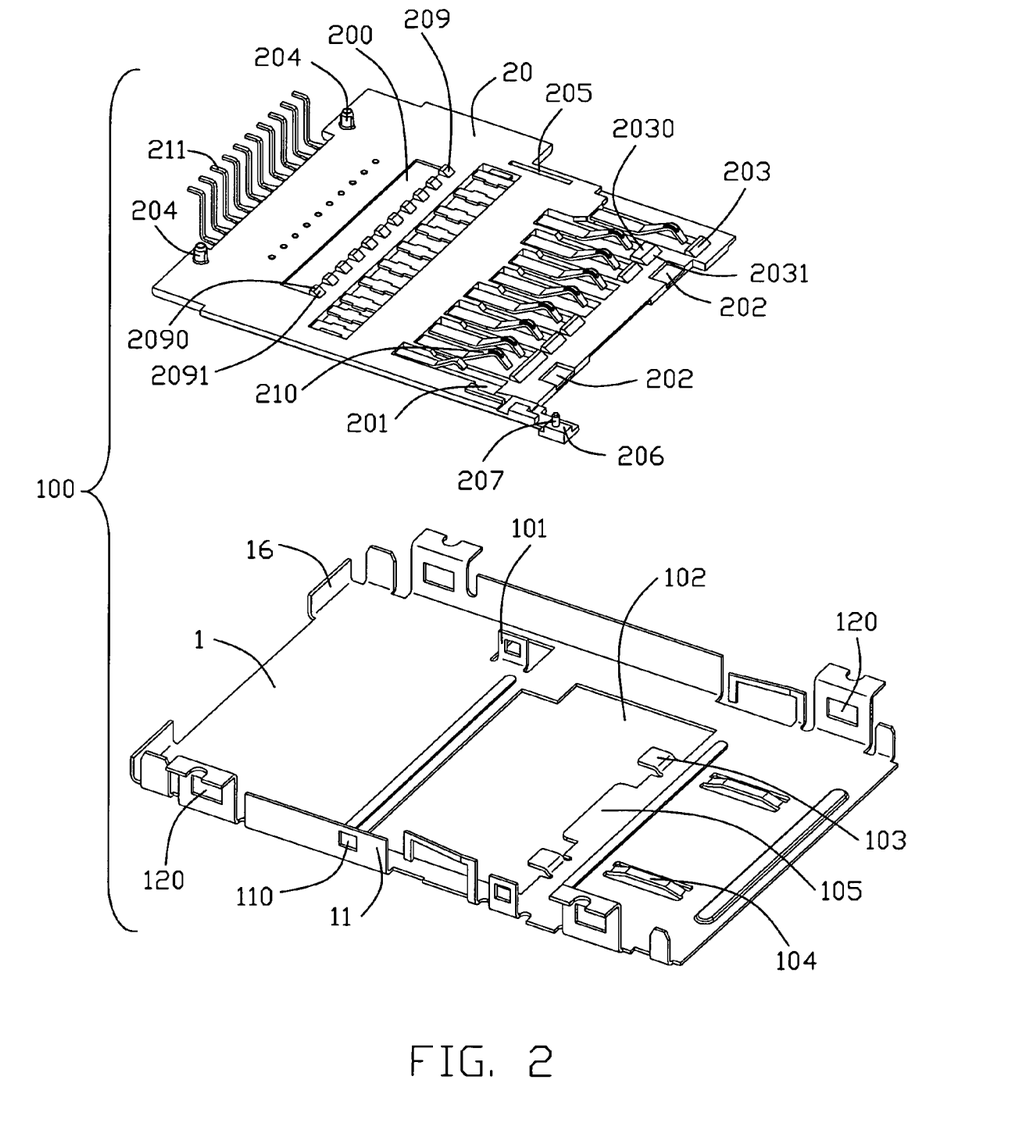
FIG. 2 is a perspective view of a shell and a terminal module of the card connector as shown in FIG. 1.
Figure 3:
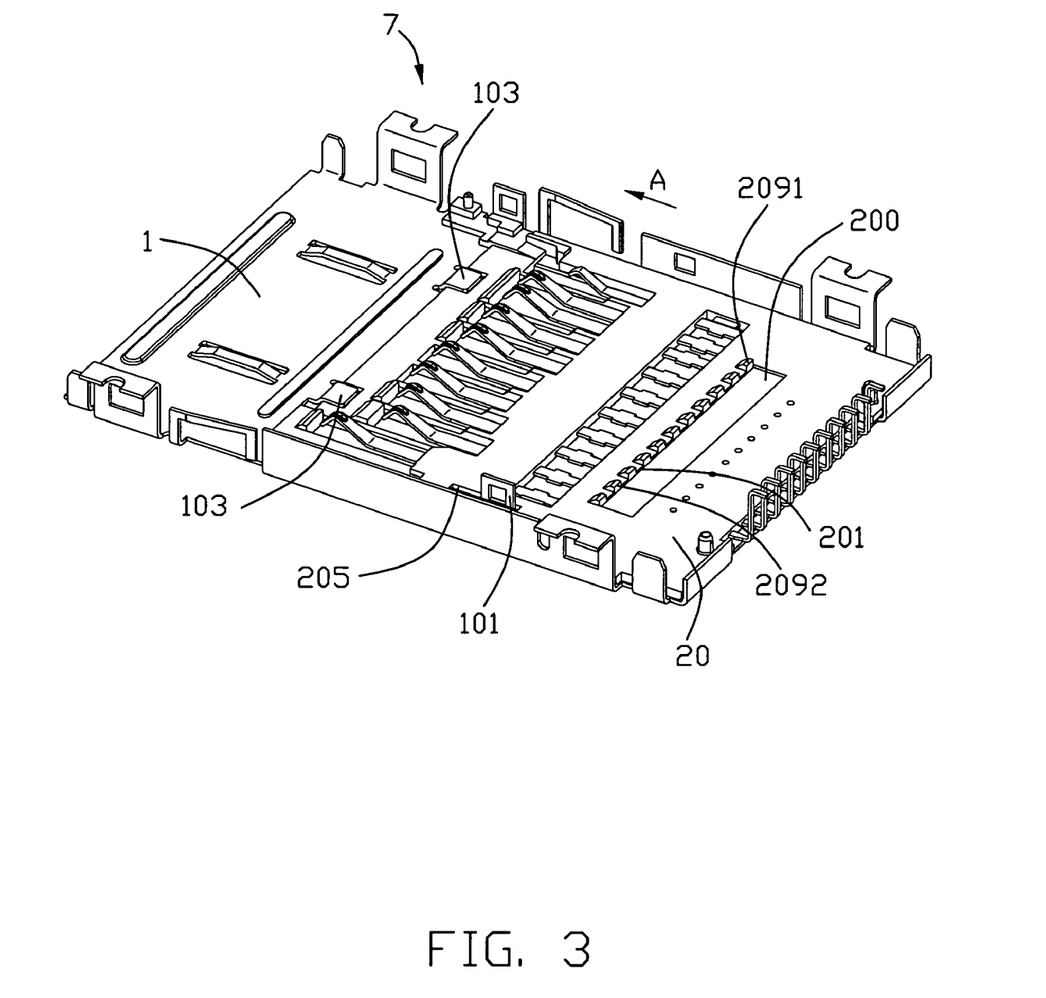
FIG. 3 is a perspective view of the terminal module mounted on the shell.
Figure 4:
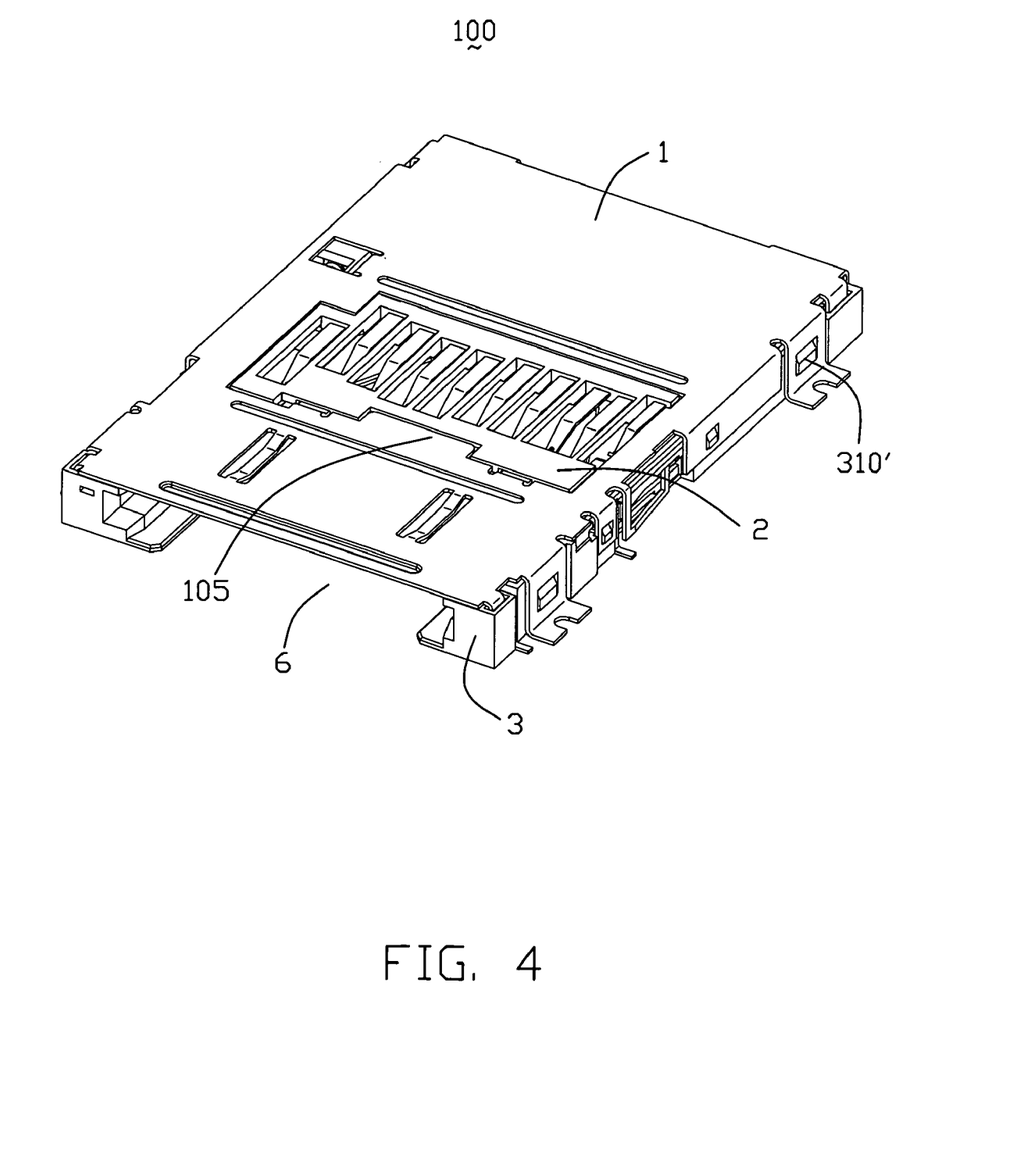
FIG. 4 is a perspective, assembly view of the card connector in accordance with the present invention.

As shown in FIG. 1 to FIG. 3, the shell 1 is approximately rectangular, comprising a main body 10, a plurality of lateral walls 11 extending from the main body 10 downwardly, a plurality of supporting foots 12 extending downwardly thereafter outwardly from the main body 10, a pair of first insertion rods 14 and a pair of second insertion rods 15 formed on the opposite front ends and the rear ends of the main body 40, respectively. As shown most clearly in FIG. 2, a fixing hole 110 is defined on each lateral wall 11. The main body 10 has a pair of pressing pieces 103, a holding plate 105, a pair of elastic pieces 104 for holding down any insertion card, a hole 102 configured in accordance with the terminal module 2, a pair of stopping pieces 16 and a position plate 101. Each pressing piece 103 extends from one edge of the hole 102 in a card insertion direction. The stopping pieces 16 are formed on the rear end edge of the main body 10.

The terminal module 2 mounted on an inner side of the shell 1, has a body plate 20 and a plurality of first terminals retained in the body plate. The body plate 20 comprises a pair of recesses 202 formed on the head of the body plate 20, a plurality of first protection blocks 203 placed at the front of corresponding first terminals 21, a plurality of terminal rooms 201 for accommodating the terminals, a narrow gap 205, a recessed terminal groove 200, a plurality of second protection blocks 209 and a pair of posts 204. The body plate 20 is thick enough for the terminal groove. The second protecting blocks 209 are formed on the front edge of the terminal groove 200. Similar to the posts 204, a post 207 is formed on one protruding head 206 of the body plate 20. The first protection blocks 203 and the second protection blocks 209, respectively, comprise a first deflect face 2031 and a first level face 2030, a second deflect face 2091 and a second level face 2090. Regarding to the first terminals 21, each comprises an engaging portion 210, a fixing portion (not labeled) and a soldering portion 211 extending from the fixing portion beyond the body plate 20. The first terminals are adapted to engage with the first card. On the opposite face of the body plate 20, a channel 208 is defined.

The insulating housing 3 is rectangular according with the configure of the cover 1, comprising a base section 30 with plurality of through holes (not labeled) extending along an inserting direction of the card, a pair of offset portions 31 extending from the opposite ends of the base section 30 in a card ejecting direction and a plurality of second terminals 5 retained in the base section. A card slot 6 is defined by the base section 30 and the pair offset portions 31. The second terminals 5 protrude into the card slot 6 and suspend therein to engage with the second card. The first terminals 21 and the second terminals 5 extend outwardly from the card slot 6 in tow rows, and the first terminals 21 are located in a higher interface than that where the second terminals 5 are located. Each second terminal 5 comprises a tail section protruding out of the card slot, an engaging section projecting into the card slot 6 to engage with the selecting card, and a suspending section connecting the tail section and the engaging section. Each engaging section has a lead point at the free end thereof. On each off-set portion 31, two fastening chambers 314 and 315 are defined corresponding to the robs 14 and 15 of the shell 3. The base section 30 has a pair of circle holes 301 corresponding to the posts 204 of the shell 1, similarly, a circle hole 313 is formed on one offset portion 31 for mating with the post 207. A plurality of embossments 310 is designed on the outside face of each offset portion 31. Furthermore, a first position groove 311 is designed on one offset portion 31, and a second position groove 311' is designed on the opposite offset portion 31. The first position groove 311 and the second position groove 311' are used for placing the first ejecting mechanism 4 and the second mechanism 4', respectively. An inner wall 316 of one offset portion 31 is formed adjacent to the first position groove 311. In addition, a first post 312 and a second post 312' are formed from the offset portions 31 into the first position groove 311 and the second groove 311', respectively. The fastening chambers 314, 315 and the circle holes 301, 313 are all digged downwardly. The card slot 6 is defined a first shorter card slot and a second longer card slot for accommodating the first and the second card, respectively. The second terminals 5 each has a tail section, a suspending section and an engaging section (not labeled) projecting into the card slot 6 to connect with the second card.

The second ejecting mechanism 40 for ejecting the insertion of the second card, is placed in the second position groove 311' and comprises an ejecting member 40' engaging with the insertion of the second card, a slider 42' sliding in a heart-shaped groove on the ejecting member 40', and a spring member 41' distorting elastically subject to the second card insertion or ejecting and allowing the ejecting member to comeback to an original position. The ejecting process of the second ejecting mechanism 4' is known as a publication skill, so it is omitted in this description.

Figure 5:
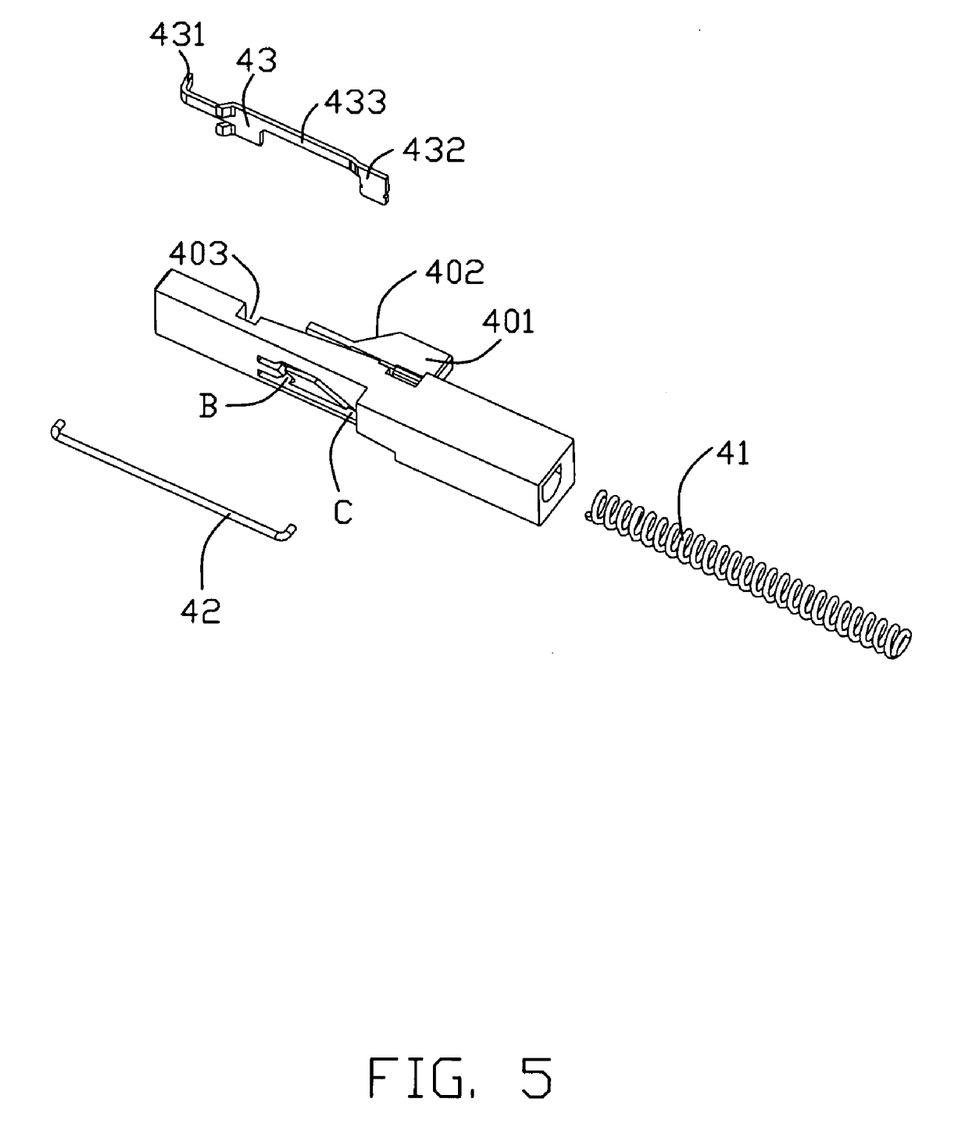
FIG. 5 is an exploded view of an ejecting mechanism having a locking device.
Figure 6:
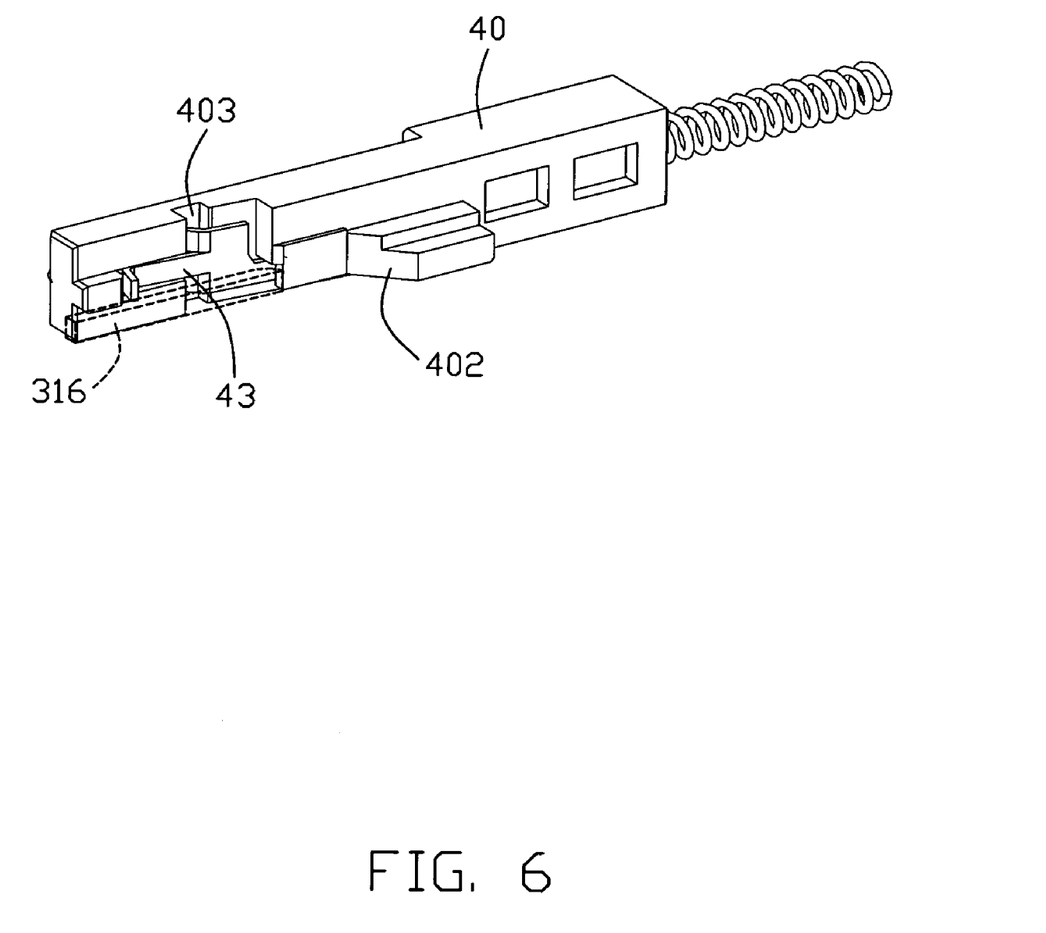
FIG. 6 is an perspective view of the ejecting mechanism at the beginning stage of a card inserted into the card connector and the locking device receiving in the ejecting mechanism by a pressure of an inner wall of the card connector.
Figure 7:
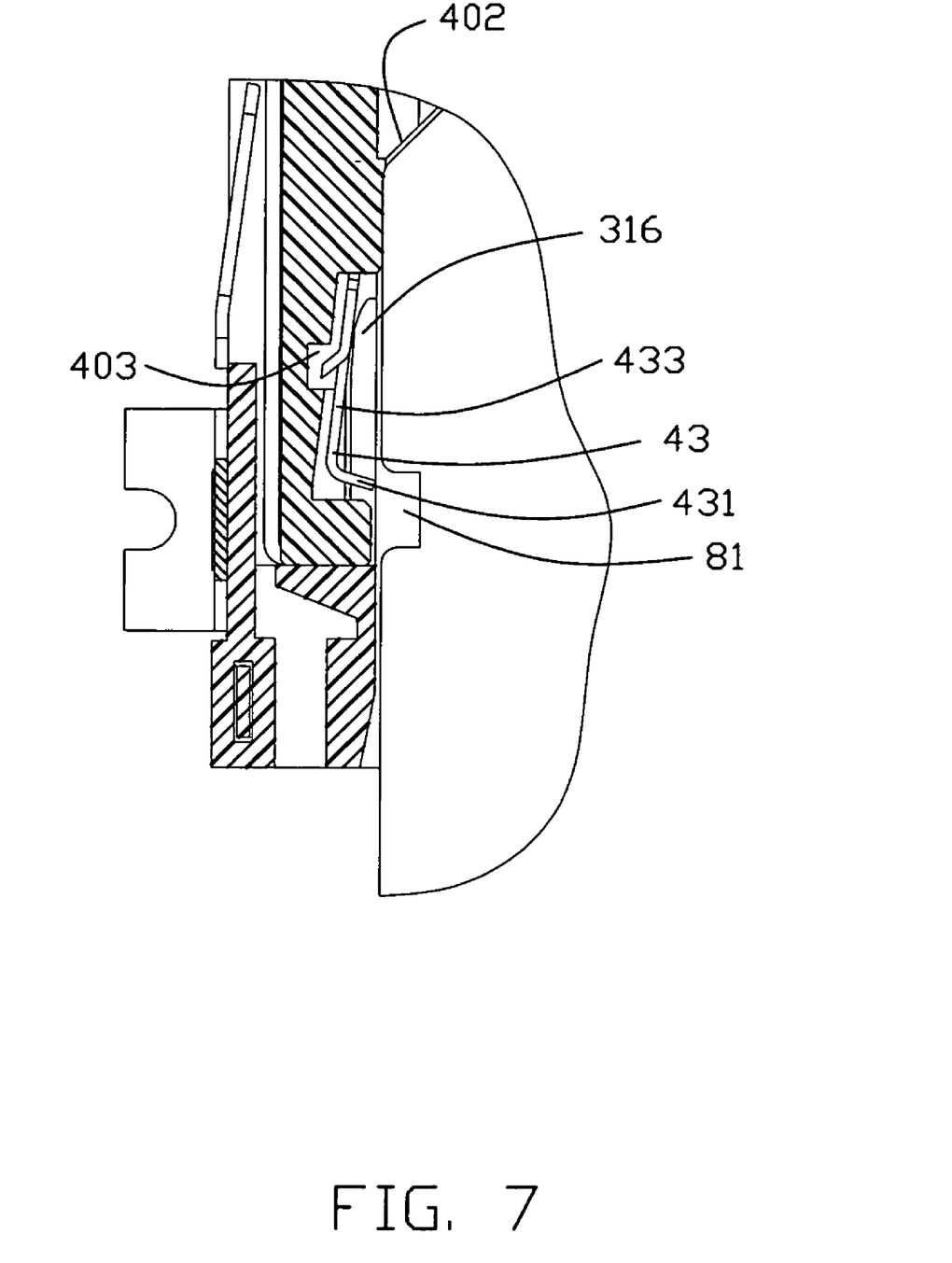
FIG. 7 is an elevated cross-sectional view of the ejecting mechanism at the beginning stage of an insertion of the card as show in FIG. 6.
Figure 8:
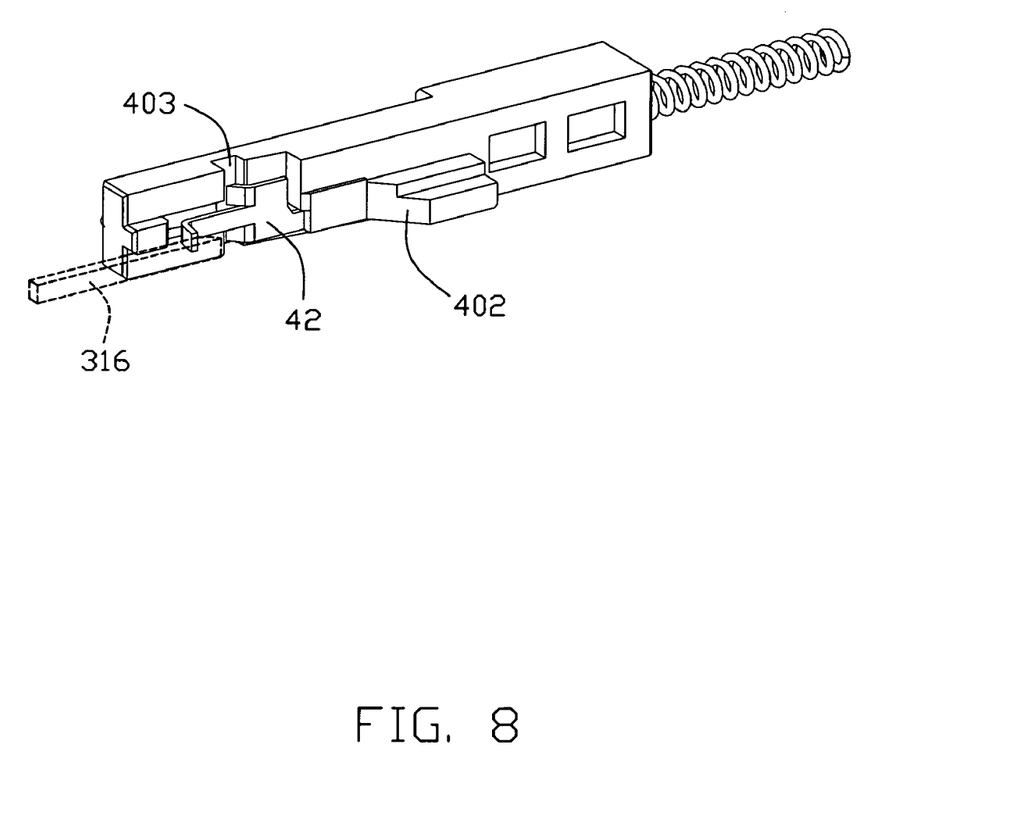
FIG. 8 is a perspective view of the ejecting mechanism at the stage of the card inserted completely and the locking device protruding from the ejecting mechanism to a groove of the card.
Figure 9:
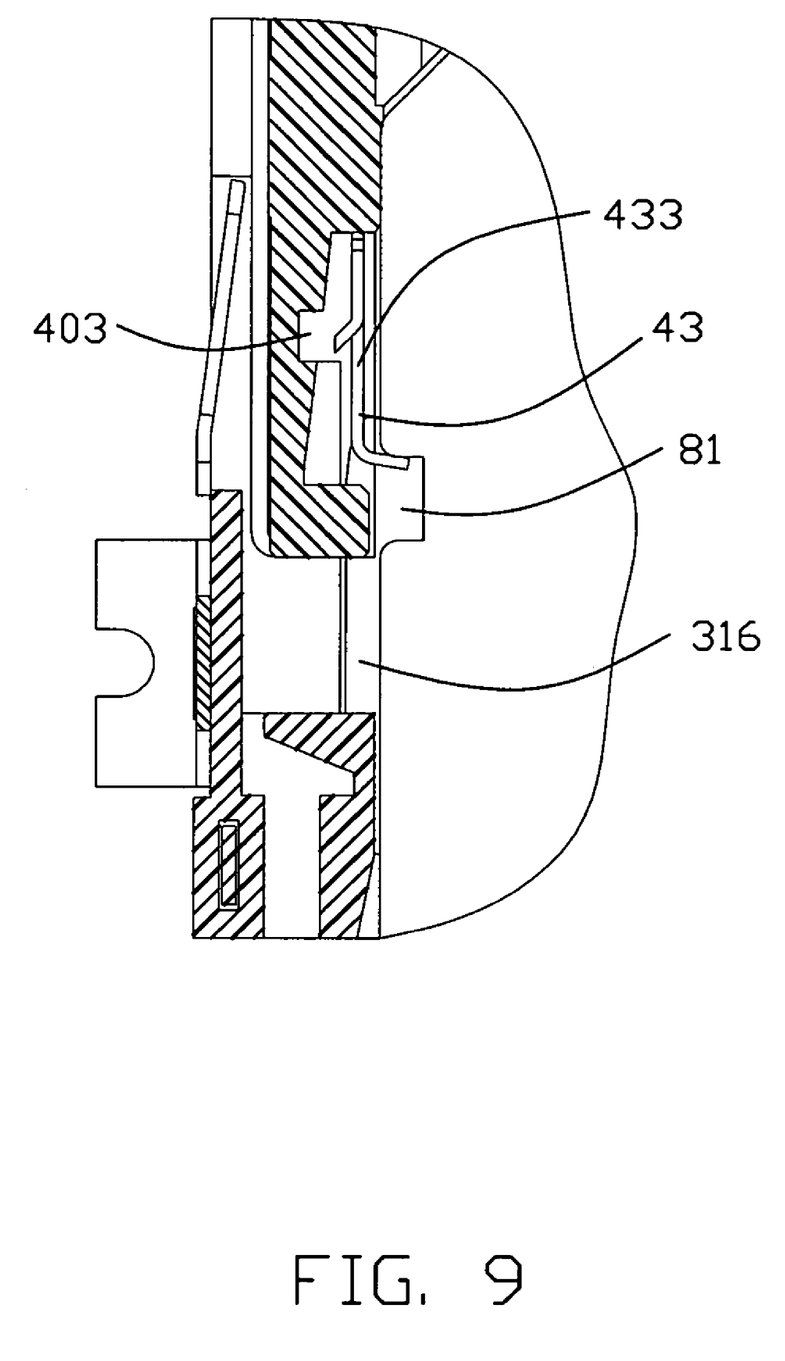
FIG. 9 is an elevated cross-sectional view of the ejecting mechanism as shown in FIG. 8.

As shown in FIG. 1 and FIG. 5, substantially, the structure of the first ejecting mechanism 4 is similar to that of the second ejecting mechanism 4' except a locking device receiving therein. Therefore, the first mechanism also comprises an ejecting member 40 for engaging with the first card and moving subject to the card inserting or ejecting, a spring member 41 and a slider member 42. The ejecting member 40 has a protruding portion 401 with an engaging face 402 for connecting with a cutout face (not labeled) of the first card directly. A locking device 43 is placed in an aperture 403 of the ejecting member 40 to prevent an insertion card from removing out of the card slot.

The locking device 43 is a long elastic configure, comprising a locking portion 431, a fitting portion 432 and a cantilever portion 433. The cantilever portion 433 joins the locking portion 431 with the fitting portion 432. The cantilever portion 433 further has a pair of limbs extending outwardly from the card slot to the aperture 403 of the ejecting member 40. The fitting portion 432 is retained in the aperture 403 of the ejecting member 40 and the locking portion extends towards to the card slot 6.

Together with FIG. 1 to FIG. 4, the relationship of the elements of the card connector as described above will be illustrated in following segments.

The terminal module 2 is mounted in the inner face of the shell 1 with the pressing pieces 103 placed in corresponding recesses 202, the holding plate 105 retained in the channel 208, the position plate 101 going through the position hole 205. The first ejecting mechanism 4 is located in the first groove 311 in such manner that one end of the spring 41 is connected with the first post 312, the locking device 43 is situated in the aperture 403 of the ejecting member 40 with the cantilever 433 pressed by the inner wall 316 (shown in FIG. 7). The second ejecting mechanism 4' is placed in the second groove 311' by one end of the spring 41' attaching to the second post 312' and one end of the slider 42' attaching to one offset portion 31. Finally, a cover device formed by the terminal module 2 associating with the shell 1 is mounted on the insulating housing 3 with the insertion pieces 14 and 15 retained in corresponding fastening chamber 314 and 315, the posts 204 and 207 retained in corresponding circle holes 301 and 313. Properly, a leading point extending from the engaging section of each second terminal 5 projects into the terminal groove 200. Thereafter, the card slot 6 is formed to allow a wider first card and a longer second card selectively inserted into.

The operation of the locking device 43 of the first ejecting mechanism 4 will be described in detail with reference to FIG. 6 to FIG. 9.

In normal circumstance, the slider device 43 is retained in the ejecting member 40 of the first mechanism 4, when the first card with a groove 81 is pushed forwardly into the first card slot, its head will engage with the pushing portion 402. Upon a further insertion, the first ejecting mechanism 4 is actuated and moves forwardly, until the first card arrives a desirable position. Accordingly, the locking device 43 moves far away from the inner wall 316, and the cantilever portion 433 of the locking device is released by the elasticity to make the locking portion 431 project into the groove 81 of the first card. After this action, the card is situated in the card slot safely regardless of a shaking or swing of the card connector until a user projects the first card. On the contrast, when the first card is ejected, pushing the card in a card insertion direction and then the ejecting first mechanism 4 is actuated, and the ejecting member 40 pushes the card backwardly. Upon a further move of the ejecting member 40, the locking device 43 is more and more near to the inner wall 316 and the cantilever portion 433 is pressed gradually by the inner wall 316, forcing the locking piece 43 received in the aperture 403 as original situation. Otherwise, the first card can be ejected without any interference.

The second protection blocks 209 and the terminal groove 200, further comprise a first front wall 2092 and a second front wall 201 respect to a direction A (shown in FIG. 3). The first front wall 2092 is located between the level face 2091 and the inner surface of the body plate 20. The second front wall 201 is a front edge of the terminal groove 200 and located between the inner face of the body plate 20 and a bottom surface of the terminal groove 200. In a perfect embodiment of this invention, the first front wall 2092 and the second front wall 201 are situated at the same face, and the second front wall 201 attach the first front wall 2092 with the terminal groove 200. In another embodiment, the first front wall 2092 and the second front wall 201 also can be situated in different surface. Respect to the direction of the card inserted, the lead point of the second terminals 5 are arranged in a line behind the first front wall 2092 and under the level surface 2091 and protruding into the terminal groove 200 in such degree that the terminals can not be depressed by the bottom face of the terminal groove 200 when the second card is inserted. In this case, the second terminals 5 is maintained safely regardless the insertion of the second card. While the second card is inserted, it crosses the deflect face 2091 thereafter the level face 2090 of the second protection blocks 209 without connecting with the head point of the second terminals 5, avoiding the second terminals being damaged The first terminals 21 are protected by the first protection blocks 203 in the same way as the described of the second terminals 5.

In this preferred embodiment of the present invention, the lead point of the second terminals 5 are protected by a protection wall face (not labeled) formed by the first front wall 2092 and the second front wall 201 associating with the terminal groove 200, accordingly, an upper surface of the protection wall face is formed by the level surface 2091 or by the inner surface of the body plate 200. In another embodiment, the second terminals 5 also can be protected by a protection wall face formed by the first front wall 2092 or by the second front wall 201 associating with the terminal groove 200. In such situation, the lead point of the second terminals 5 are located behind the protection wall face and under the level surface 2091, or protrude into the terminal groove 200 and located under the inner surface of the body plate 20, respect to the direction of the card inserted.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector for selectively receiving one of two different cards, comprising:
   a terminal module comprising a body plate and a plurality of first terminals received in the body plate;
   an insulating housing associating with the terminal module to define a card slot and a card inserting direction, the insulating housing comprising a base section designed with a plurality of through holes extending along the card inserting direction, and a pair of offset portions extending from an opposite ends of the base section along the card inserting direction; and
   a plurality of second terminals extending through the through holes of the insulating housing and suspending in the card slot, each second terminal comprising a tail section protruding out of the card slot, an engaging section projecting into the card slot to engage with a selected card, and a suspending section connecting the tail section and the engaging section, each engaging section comprising a lead point at the free end thereof, wherein
   the body plate of the terminal module comprises a protection wall face and an upper surface, and the lead points of the second terminals are arranged behind the protection wall face and under the upper surface of the protection wall face along the card inserting direction;
   wherein the protection wall face is formed near a front edge of a recessed terminal groove of the body plate; and
   wherein the protection wall face is formed on a protection block protruding from the body plate into the card slot; and
   wherein the protection block comprises a deflect face and a level face connecting the deflect face with the protection wall.

2. The card connector as claimed in claim 1, further comprising a shell attaching with the terminal module.

3. The card connector as claimed in claim 1, wherein the first terminals and the second terminals extend outwardly from the card slot in two rows, and the first terminals are located in a higher interface than that of the second terminals located.

4. The card connector as claimed in claim 1, further comprising an ejecting mechanism, and one of the offset portions has a position groove receiving the ejecting mechanism.

5. The card connector as claimed in claim 1, wherein the body plate of the terminal module comprises another set of protection blocks located at the front of the first terminals along the card inserting direction.

6. The card connector as claimed in claim 2, wherein the shell comprises a main body and a plurality of lateral walls extending from the main body.

7. The card connector as claimed in claim 6, wherein the main body comprises a pair of pressing pieces, and a pair of recesses are formed on the body plate of the terminal module for locking with corresponding pressing piece of the main body.

8. The card connector as claimed in claim 6, wherein a holding plate is formed on the main body, and the body plate of the terminal module defines a channel to mate with the holding plate.

9. The card connector as claimed in claim 8, wherein the body plate further comprises a plurality of posts, and the insulating housing defines a plurality of holes to lock with corresponding posts.

10. The card connector as claimed in claim 9, wherein the main body of the shell comprises a position plate, and a gap is defined on the body plate of the terminal module corresponding to the position plate.

11. The card connector as claimed in claim 4, wherein the two cards comprises a first card with a cut face and a groove on a lateral side thereof and a second card longer than the first card.

12. The card connector as claimed in claim 11, wherein a locking device is mounted in the ejecting mechanism and is pressed therein by an inner wall of one of two offset portions of the insulating housing, when a card is inserted completely, the locking device is released and protruding into the groove of the first card.

* * * * *